US007066204B2

(12) United States Patent
Marty

(10) Patent No.: US 7,066,204 B2
(45) Date of Patent: Jun. 27, 2006

(54) MULTI-PORT DIVERTER VALVE ASSEMBLY WITH INTEGRAL DETENT

(75) Inventor: Garry R. Marty, Fishers, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 306 days.

(21) Appl. No.: 10/629,799

(22) Filed: Jul. 29, 2003

(65) Prior Publication Data

US 2005/0022885 A1 Feb. 3, 2005

(51) Int. Cl.
*F16K 11/072* (2006.01)
(52) U.S. Cl. .............................. 137/625.11; 137/625.46
(58) Field of Classification Search ........... 137/625.11, 137/625.12, 625.15, 625.47; 251/297
See application file for complete search history.

(56) References Cited

U.S. PATENT DOCUMENTS

| 2,830,564 A | * | 4/1958 | Bryant .................. 137/625.11 |
| 3,206,926 A | * | 9/1965 | Lockwood ............. 137/625.11 |
| 4,173,325 A | | 11/1979 | Petrovic ..................... 248/81 |
| 4,187,986 A | | 2/1980 | Petrovic ..................... 239/449 |
| 4,281,681 A | | 8/1981 | Teague, Jr. et al. ......... 137/562 |
| 4,458,839 A | | 7/1984 | MacDonald ............. 236/12.16 |
| 4,574,842 A | * | 3/1986 | Cordova ................ 137/625.15 |
| 4,632,148 A | * | 12/1986 | Stark et al. ............ 137/625.11 |
| 4,640,457 A | | 2/1987 | MacDonald ............. 236/12.11 |
| 4,699,172 A | | 10/1987 | MacDonald ................ 137/551 |
| 4,742,848 A | * | 5/1988 | Black ......................... 251/297 |
| 4,838,304 A | | 6/1989 | Knapp ..................... 137/454.6 |
| 4,874,006 A | * | 10/1989 | Iqbal .......................... 137/597 |
| 4,887,635 A | | 12/1989 | Johnson ....................... 137/393 |
| 4,968,334 A | * | 11/1990 | Hilton .................... 137/625.47 |
| 5,095,893 A | | 3/1992 | Rawden, Jr. ................. 128/66 |
| 5,176,165 A | | 1/1993 | Traylor ..................... 137/216.1 |
| 5,188,149 A | | 2/1993 | Williams ............... 137/625.47 |
| 5,193,582 A | | 3/1993 | Antoniello et al. ..... 137/625.14 |
| 5,279,329 A | | 1/1994 | Pippel ..................... 137/625.29 |
| 5,427,312 A | | 6/1995 | Simonov et al. ......... 236/12.11 |
| 5,476,225 A | | 12/1995 | Chan .......................... 239/449 |
| 5,685,330 A | | 11/1997 | Breda ......................... 137/218 |
| 5,839,436 A | | 11/1998 | Fangrow, Jr. et al. ... 128/205.24 |
| 5,901,735 A | | 5/1999 | Breda ......................... 137/218 |
| 5,970,534 A | | 10/1999 | Breda ........................ 4/541.1 |
| 5,976,362 A | | 11/1999 | Wadsworth et al. .......... 210/87 |
| 6,073,972 A | | 6/2000 | Rivera .......................... 285/64 |

(Continued)

FOREIGN PATENT DOCUMENTS

WO          WO01/66986          *   9/2001

*Primary Examiner*—John Rivell
(74) *Attorney, Agent, or Firm*—Woodard, Emhardt, Moriarty, McNett & Henry LLP

(57) ABSTRACT

A multi-port diverter valve assembly with an integral detent feature includes a valve body and a diverter valve cartridge and cap combination wherein the cap includes one or more deflectable fingers positioned so as to "detent" into one or more detent recesses formed in a lower cartridge portion of the rotatable cartridge. In order to provide fluid communication to external hydraulic devices with a total of six selection options, a total of six detent recesses are provided. In the preferred embodiment, there are two deflectable fingers approximately 180 degrees apart. An O-ring is positioned between the deflectable fingers and the valve body in order to provide part of the resistance force against the deflectable fingers so as to provide a tactile feel to the user when a selected detent position is reached by rotation of the diverter valve cartridge within the valve body.

8 Claims, 10 Drawing Sheets

U.S. PATENT DOCUMENTS

| | | | |
|---|---|---|---|
| 6,123,094 A | 9/2000 | Breda | 137/98 |
| 6,123,837 A | 9/2000 | Wadsworth et al. | 210/87 |
| 6,196,266 B1 | 3/2001 | Breda | 137/625.11 |
| 6,378,785 B1 | 4/2002 | Dodd | 239/318 |
| 6,634,380 B1 * | 10/2003 | Bartkus et al. | 137/625.46 |

* cited by examiner

MULTI-PORT DIVERTER VALVE ASSEMBLY WITH INTEGRAL DETENT

BACKGROUND OF THE INVENTION

The present invention relates in general to multi-port diverter valves for directing a liquid, typically water, from a mixing valve to one or more of a plurality of selectable outlets. The outlets are associated with various hydraulic devices, such as a hand wand, a showerhead, and a body sprayer. More specifically, the present invention relates to the modification of such a multi-port diverter valve to include an integral detent structure and the elimination of a more costly spring-loaded stainless steel ball that is used to provide a detent feature.

A diverter valve is typically designed to be assembled between a flow control device or a valve such as a mixing faucet and one or more other hydraulic devices. One common example of a diverter valve is the use of a mixing valve for a shower and tub combination. The mixing valve provides proportional quantities of hot and cold liquids, typically water. The typical style of diverter valve is actuated in order to provide fluid to one or more selected hydraulic devices such as a bath tub spout, showerhead or hand-held wand. Diverter valves commonly have a valve cartridge that is rotatable about a longitudinal axis in order to provide selective fluid communication between an inlet and one (or more) of several outlets.

While early diverter valves were typically designed to enable selection of one of two outlets and thus flow diversion to one of two hydraulic devices, such as the faucet or showerhead, it is becoming increasingly common to increase the number of showerheads or other hydraulic devices available to use within a shower. Typically, if more than one hydraulic device is installed, separate on/off valves are required in order to control the flow of fluid to each hydraulic device. It is known to install multiple showerheads within a shower to provide multiple streams of continuous and directed water flow. In such assemblies, multiple valves are required in order to selectively engage or disengage water flow through specific showerheads. Installation of such valves increases cost, complexity, and installation time. The added expense is a barrier to installing multiple showerheads in those applications where cost is of concern. To this end, multi-port diverter valve assemblies have been designed that are capable of directing fluid from an inlet to a plurality of hydraulic device outlets in various combinations.

In the design of diverter valve assemblies with multiple ports, an inner diverter component or cartridge is constructed and arranged to rotate within an outer sleeve or cap. The inner diverter cartridge includes upper and lower cartridge portions that define an interior chamber. The lower cartridge portion includes flow openings that rotate into position over flow apertures in the valve body for selecting one or more of the available hydraulic devices or a combination thereof and directing fluid to the selected hydraulic device or devices.

When a diverter valve assembly is constructed and arranged so as to be capable of being rotated into a plurality of functional positions, it is preferable to provide a positive indication to the user when indexing from one flow condition or selection to another flow condition or selection. This "positive indication" can be provided by means of a tactile feel or by means of an audible "click", or by both, as either or both would alert the operator or user that a new diverter valve position has been selected by rotation of the cartridge by means of a knob or handle.

One earlier design of this style of diverter valve assembly uses a spring-loaded stainless steel ball in order to provide a ball detent that provides the positive indication. In this design, a blind bore is machined into the receiving valve body and the rotatable diverter valve cartridge is configured with cooperating part-spherical pockets or recesses, one such recess for each diverter valve position (i.e., for each detent position). When the diverter valve is rotated into one of the plurality of detent positions, the stainless steel ball that was previously seated in the blind bore is spring biased in an upward direction and the upper portion of the ball is received by the corresponding part-spherical recess in order to create a ball detent combination denoting the particular selected position.

Since the part-spherical portion of the ball that rides out of the blind bore into the recess is dimensionally less than the radius of the ball, continued rotation of the diverter valve cartridge merely pushes the ball down into the blind bore, compressing the spring, until the next recess is reached, then allowing the spring to push the ball back up into the next recess for the next detent position. While this type of ball detent structure provides the tactile feel and may provide an audible "click", it does represent a somewhat expensive addition to the diverter valve assembly. Accordingly, it would be an improvement to diverter valve assemblies of this style with the described detent feature to be able to replace the stainless steel ball and spring with a less expensive detent structure. Additionally, diverter valve assemblies of the type to be described herein are constructed and arranged so as to permit an "all-on" condition where the diverter valve assembly enables fluid flow to all of the remote hydraulic devices. In order to achieve this configuration, the diverter valve cartridge is raised axially. With the earlier designs, this axial movement disengages the spring/ball detent and would permit rotation of the cartridge. With the present invention, since the detent feature is integral relative to the cartridge and cap combination, raising this combination does not eliminate the detent engagement and thereby provides an anti-rotation feature.

SUMMARY OF THE INVENTION

A flow diverter valve assembly according to one embodiment of the present invention comprises a base housing defining a plurality of flow passageways, a rotatable diverter cartridge positioned within the base housing and defining a plurality of detent recesses. A cap is assembled to the base housing and is positioned between the base housing and the rotatable diverter cartridge. The cap includes at least one deflectable detent finger that is constructed and arranged to sequentially engage each of the plurality of detent recesses. By means of a handle for manually rotating the diverter cartridge relative to the cap, the disclosed structure enables the user to change from one finger-to-recess detent engagement to another finger-to-recess detent engagement. Each detent engagement position corresponds to a different selection of hydraulic devices to be supplied fluid by means of the diverter valve assembly.

One object of the present invention is to provide an improved diverter valve assembly.

Related objects and advantages of the present invention will be apparent from the following description.

DESCRIPTION OF THE PREFERRED EMBODIMENTS

Figure 1:
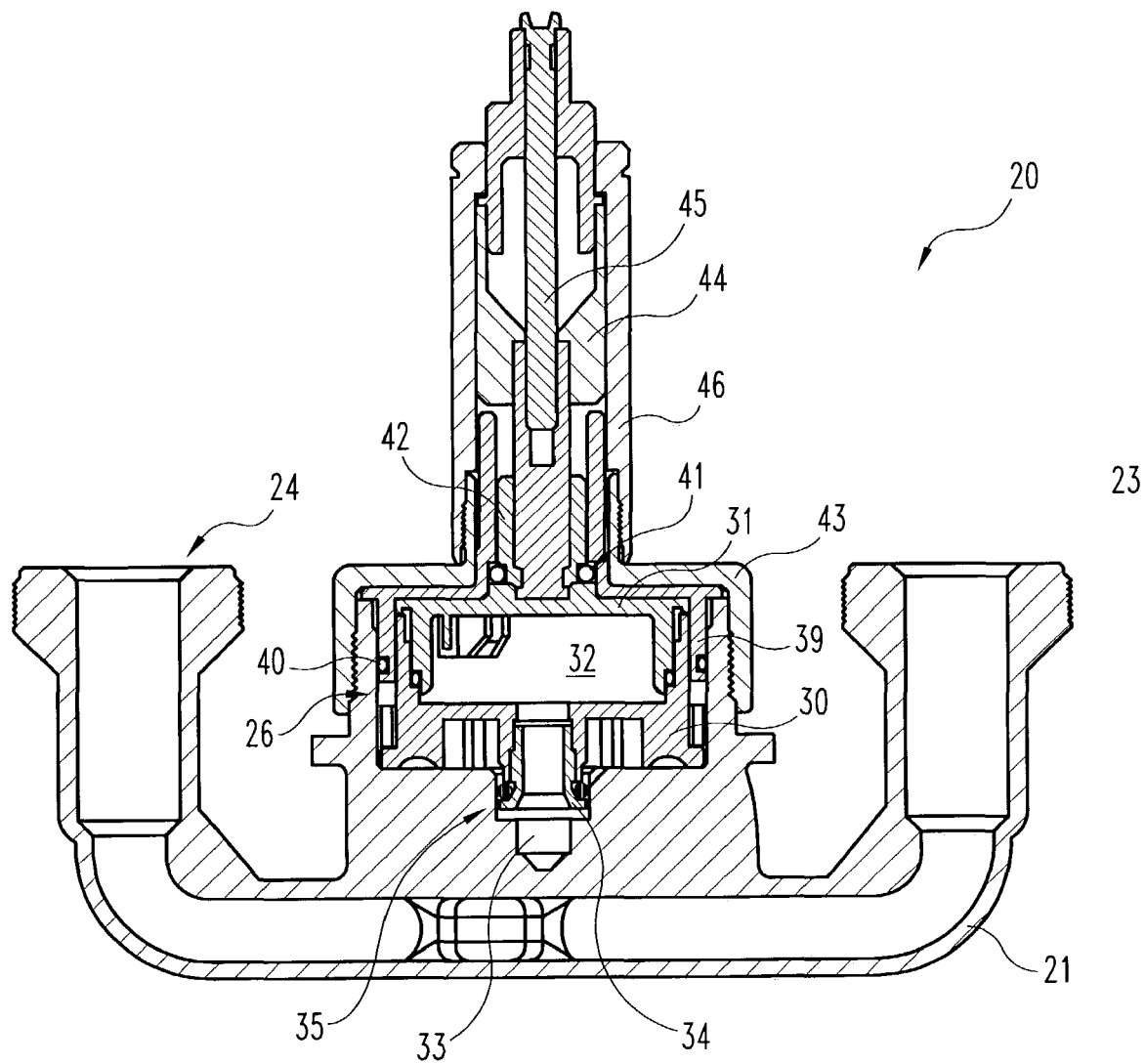
FIG. 1 is a front elevational view, in full section, of a multi-port diverter valve assembly, provided as an example for explaining the structure and functioning of such diverter valve assemblies.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
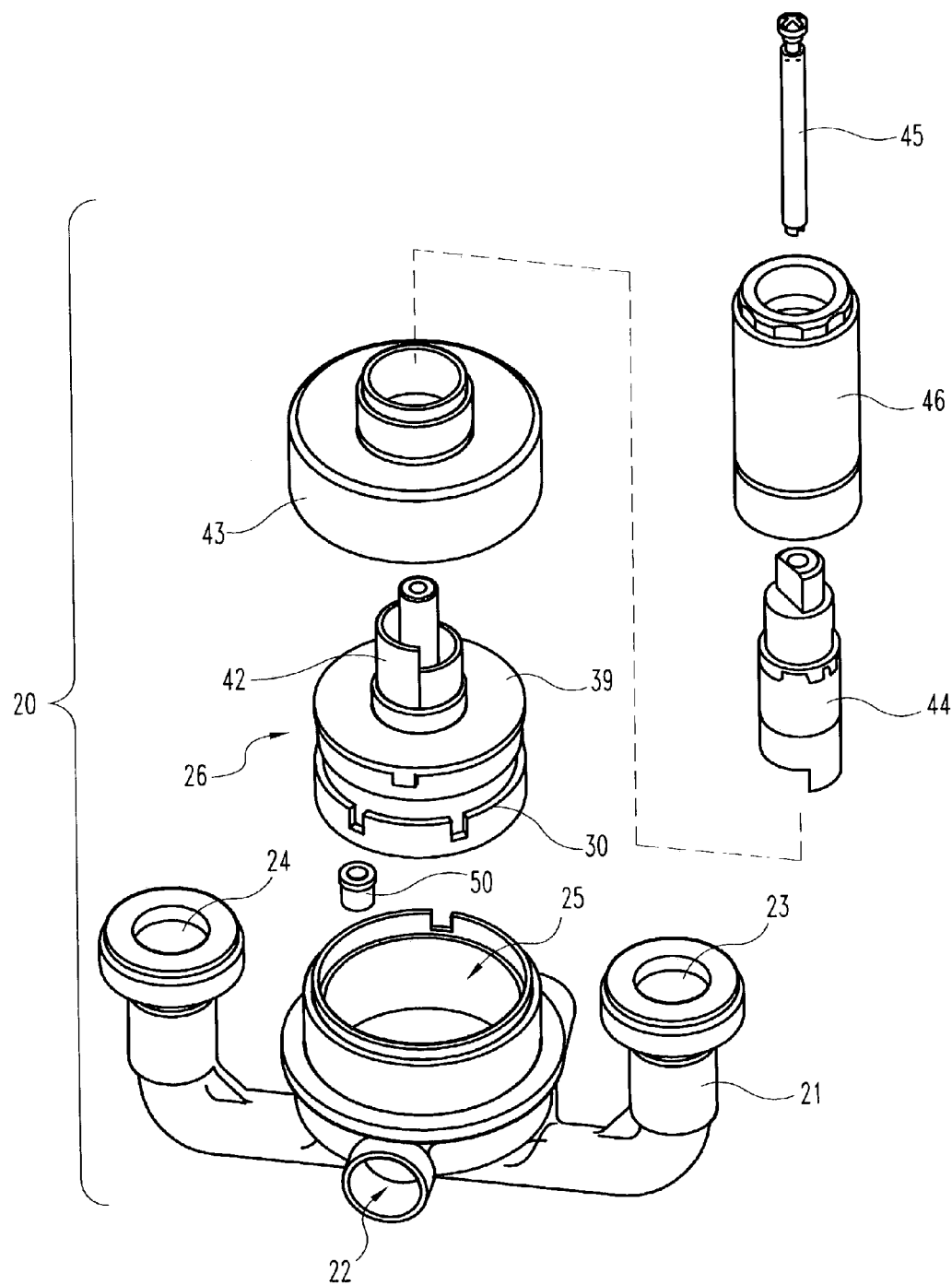
FIG. 2 is an exploded view of the primary component parts of the FIG. 1 diverter valve assembly.

Referring to FIGS. 1 and 2, a first style of a multi-port diverter valve assembly 20 is illustrated. Assembly 20 has been illustrated, and is described herein, in order to explain generally the structure and functioning of this type of multi-port diverter valve assembly so that the improvements provided by the present invention will be easier to explain and understand.

Diverter valve assembly 20 includes a valve body 21, defining an inlet 22 and outlets 23 and 24. Valve body 21 defines a bore 25 that houses a cartridge assembly 26, the cartridge assembly being another primary component of diverter valve assembly 20. The cartridge assembly 26 includes a lower cartridge portion 30 and an upper cartridge portion 31. Cartridge portions 30 and 31 are constructed and arranged to define a chamber 32. The chamber 32 is in fluid communication with inlet port 33 that is defined by and within valve body 21. An inlet boss 34 extends from cartridge assembly 26 into the inlet port 33. An O-ring 35 corresponds to an inner surface of inlet port 33 in order to provide sealing engagement.

The cartridge assembly 26 is held within bore 25 against fluid pressure from the inlet port 33 by a cap 39. The cap 39 includes an O-ring 40 that seals the outer surface of cap 39 against an inner surface of the bore 25. The cap 39 is stationary relative to cartridge assembly 26. The cartridge assembly 26 is sealed against an inner surface of cap 39 by O-ring 41. The O-ring 41 is disposed about stem portion 42 attached to the upper cartridge portion 31. Stem portion 42 extends upward through a portion of cap 39. Cap 39 and cartridge assembly 26 are held within bore 25 of valve body 21 by a bonnet 43. The bonnet 43 includes internal threads that threadingly engage external threads that are disposed as part of valve body 21 on an outer surface of bore 25. A stem extender 44 is attached to stem portion 42 and is held in place by a retention screw 45. A sleeve 46 covers the stem portion 42 and stem extender 44, providing an aesthetically-pleasing appearance.

Referring now to FIG. 2, an exploded view of the FIG. 1 valve assembly 20 is illustrated and includes the cartridge assembly 26 and bonnet 43. A detent 50 is illustrated and is assembled within the cartridge assembly 26 and is constructed and arranged to cooperate with one or more detent surfaces provided as part of the valve body 21. The detent 50 operates to provide a positive location feel of the cartridge assembly 26 as it is rotated for selection of specific outlets.

Figure 4:
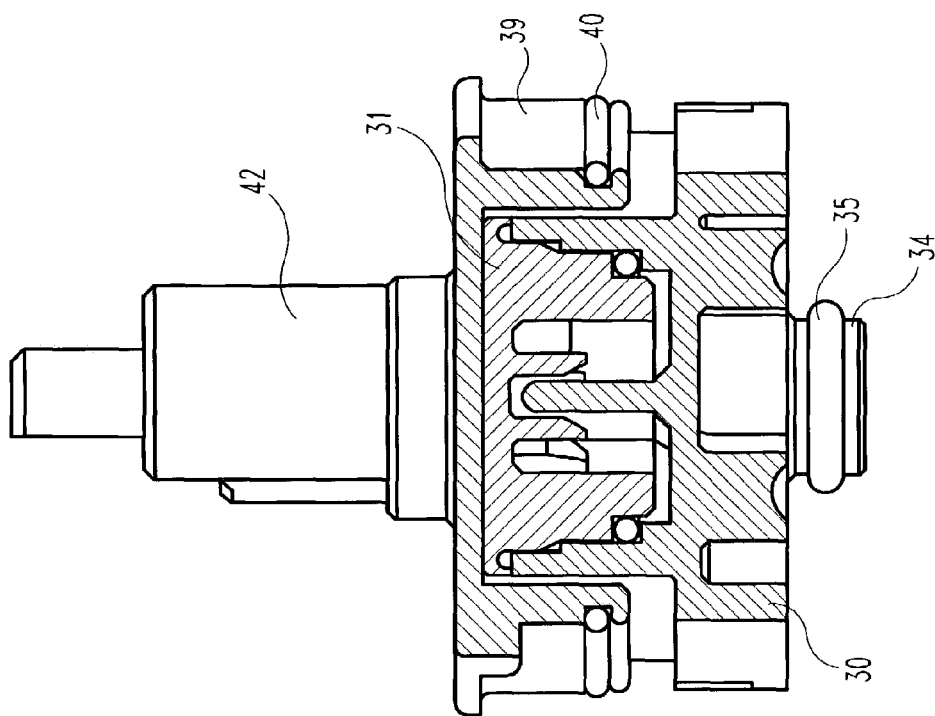
FIG. 4 is a front elevational view, in partial section, of the FIG. 3 diverter cartridge as viewed along line 4—4 in FIG. 3.
Figure 3:
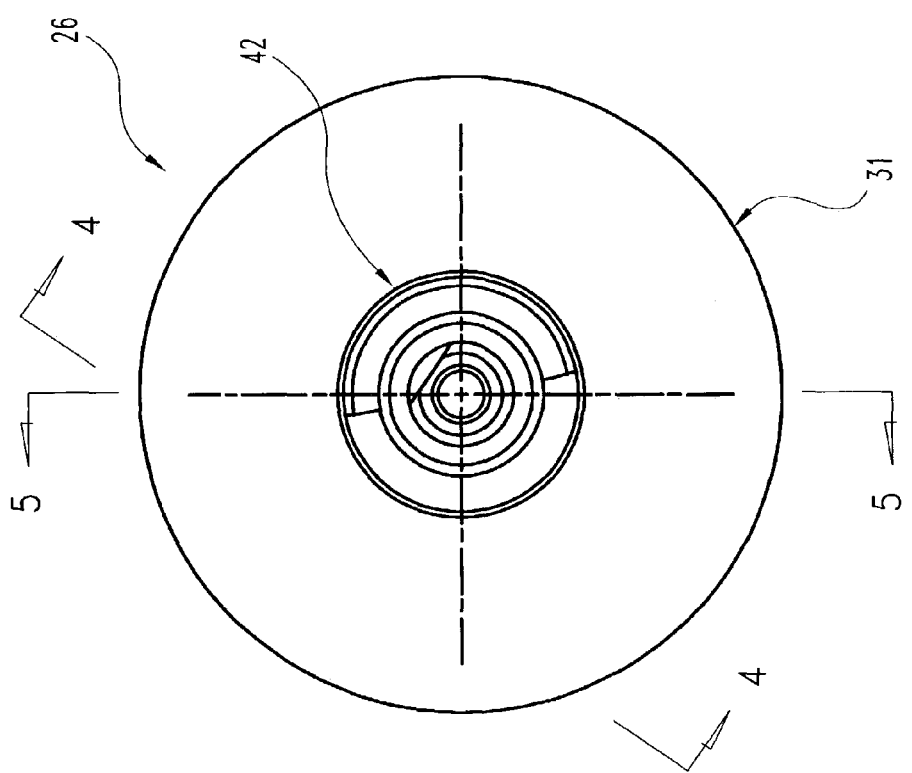
FIG. 3 is a top plan view of a diverter cartridge comprising one portion of the FIG. 1 diverter valve assembly.
Figure 5:
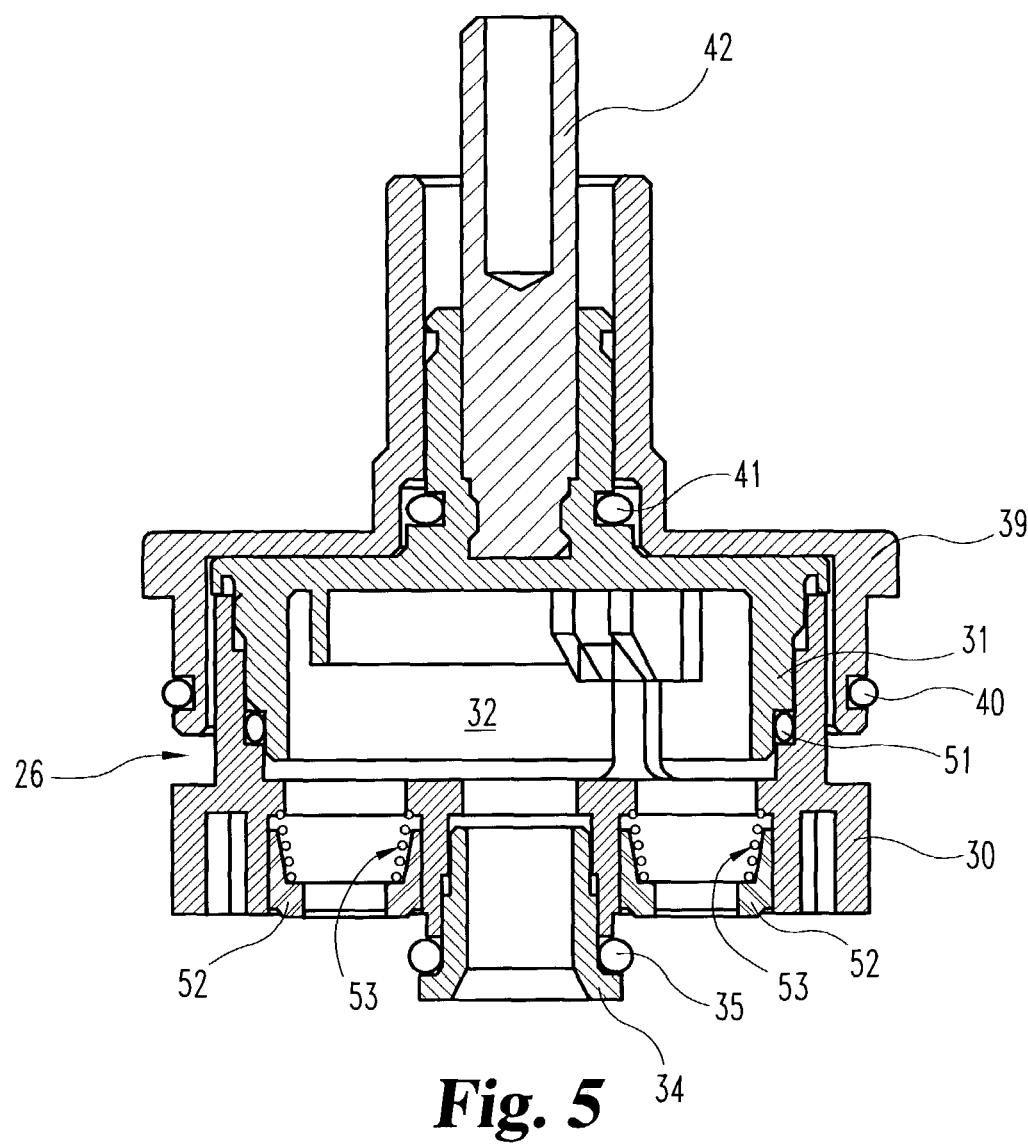
FIG. 5 is a front elevational view, in full section, of the FIG. 3 diverter cartridge as viewed along line 5—5 in FIG. 3.

Referring to FIGS. 3, 4, and 5, the cartridge assembly 26 includes the cup-shaped upper cartridge portion 31 that is inserted within the cup-shaped lower cartridge portion 30 to form inner chamber 32. A seal is provided between the upper and lower cartridge portions 31 and 30 by O-ring 51. The inner chamber 32 fills with fluid by way of inlet boss 34. Inlet boss 34 extends below a lower surface of the lower cartridge portion 30 to engage the inner surface of the inlet port 33. Fluid flows from the inlet port 33 into the inner chamber 32 through outlet seats 52.

The outlet seats 52 are biased to create a sealing engagement within the lower surface of the bore 25 by way of biasing springs 53. Preferably there are at least three outlet seats 52 within the cartridge assembly 26. The outlet seats 52 are constructed of a material that is durable in order to provide a sealing contact with the bottom surface of the bore 25. The outlet seats 52 correspond to specific outlet ports within bore 25. Rotation of the cartridge assembly 26 provides selective fluid communication between the inlet port 33 and the various outlet ports depending on which of the outlet seats 52 are in communication with the outlet ports. Preferably, any one or a combination of two outlet ports can be in fluid communication with the inlet port 33 at any one time, depending on the specific location of the cartridge assembly 26 as it is rotated within bore 25. This in turn provides for the supply of fluid to multiple hydraulic devices from a common inlet.

Figure 6:
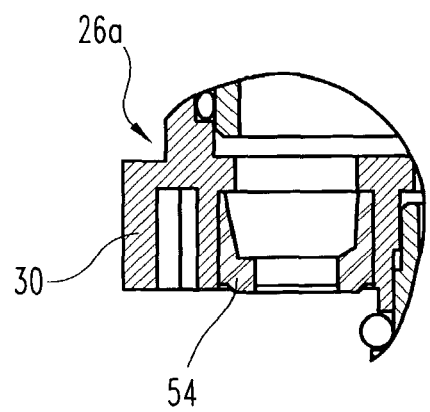
FIG. 6 is a partial, front elevational view, in full section, of one modification to the diverter cartridge structure illustrated in FIG. 5.

Referring to FIG. 6, an alternative embodiment of the cartridge assembly 26 is illustrated. This alternative cartridge assembly 26a includes springless outlet seats 54. Each outlet seat 54 is configured to seat within the outlets of the valve assembly and includes a compliant material for biasing against the lower surface of bore 25. Each outlet seat 54 creates a seal with the bottom surface of bore 25. Each outlet seat 54 comprises a rubber material with a suitable elasticity for the intended function. The elasticity of the rubber material provides the biasing force required to create the seal with the bottom surface of bore 25.

In operation, a mixing valve is used to provide and supply fluid at a desired temperature. The diverter valve assembly is then selectively rotated to engage the specific outlet seats 52 with the specific outlet ports desired and corresponding to the hydraulic device outlets. The outlet ports are arranged within bore 25 such that any two outlet ports can be supplied with fluid from the inlet port 33 at any one time. Further, the cartridge assembly 26 may also be rotated within bore 25 to engage any single outlet port corresponding to any one hydraulic device.

Figure 7:
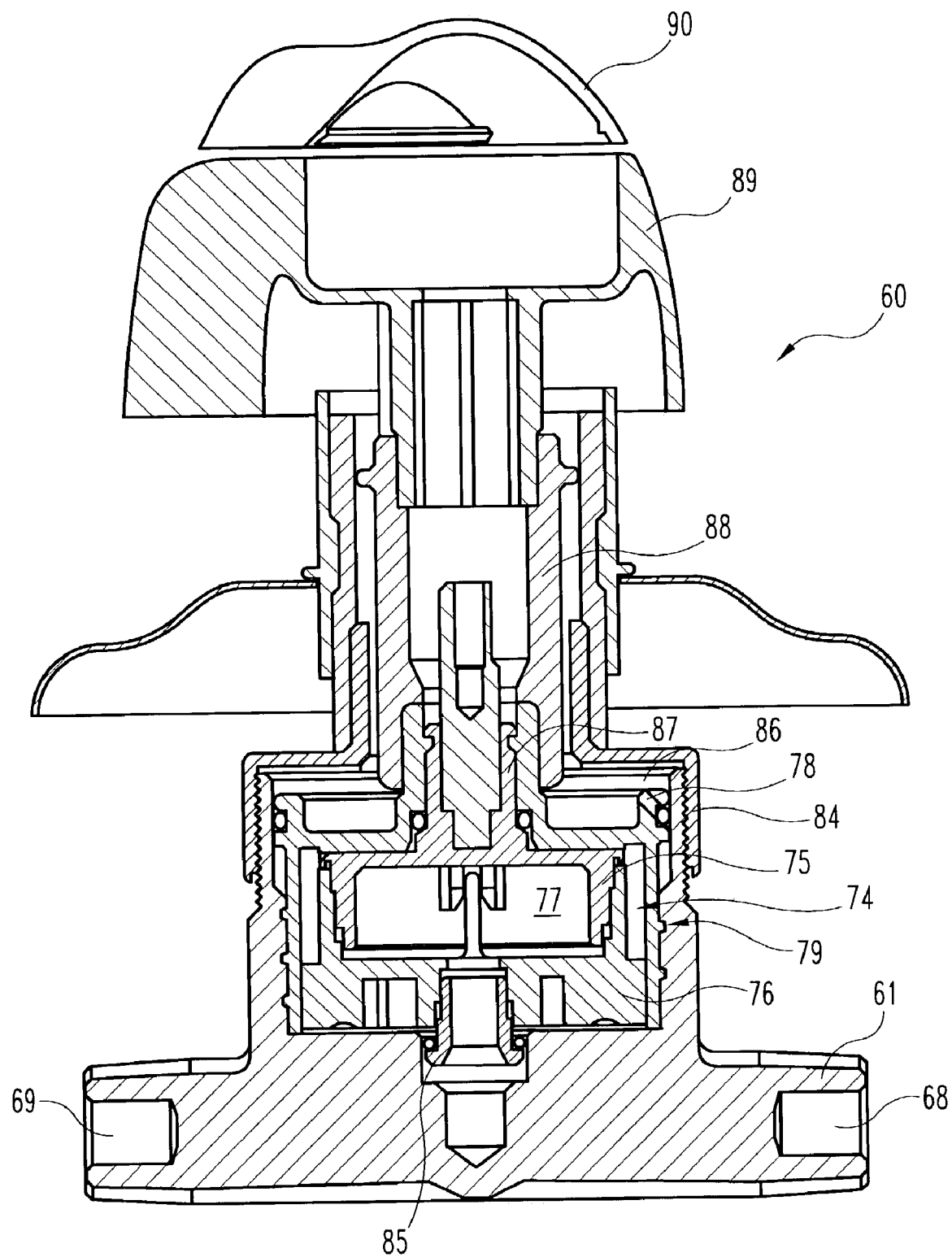
FIG. 7 is a front elevational view, in full section, of a multi-port diverter valve assembly, provided as an example of the structure and functioning of this type of diverter valve assembly.
Figure 8:
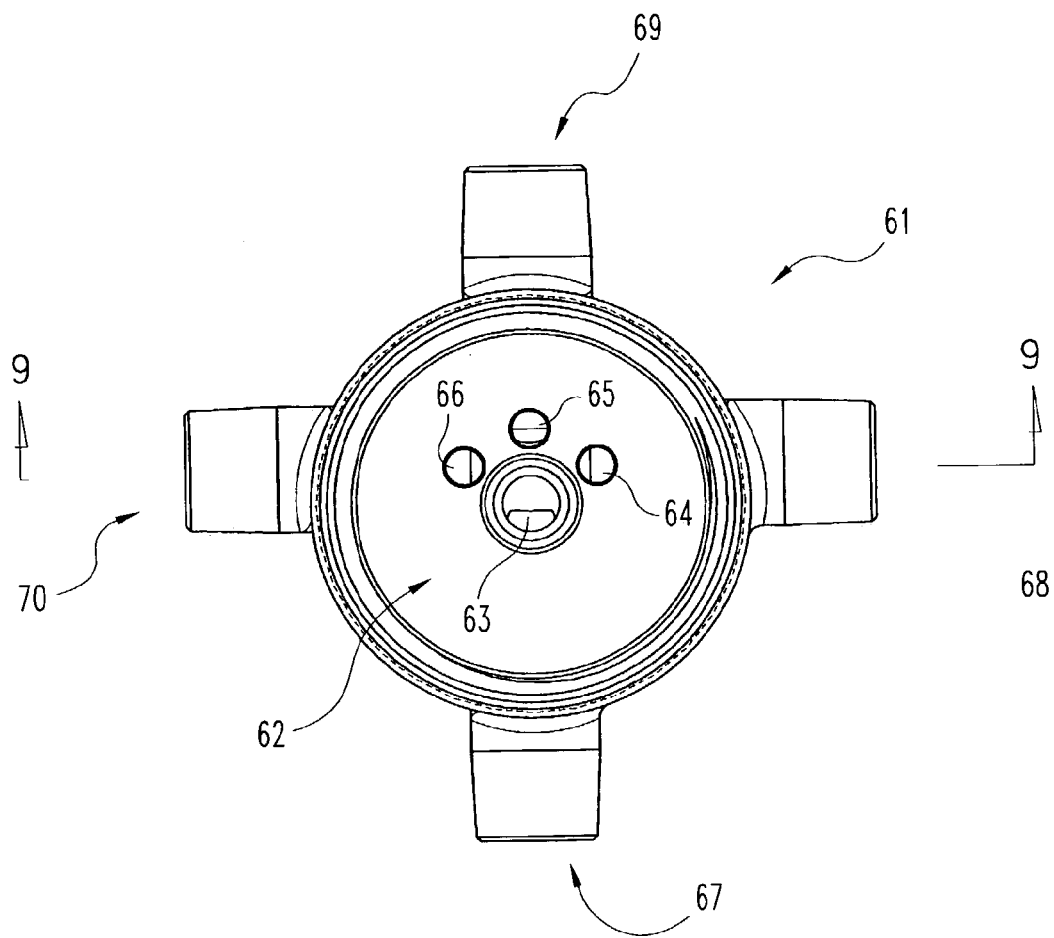
FIG. 8 is a top plan view of a valve body comprising a portion of the FIG. 7 assembly.
Figure 9:
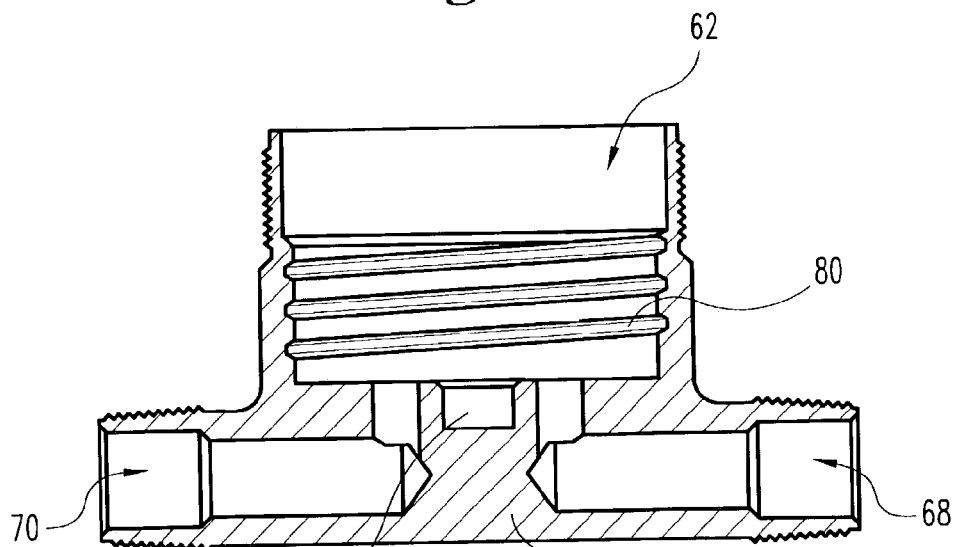
FIG. 9 is a front elevational view, in full section, of the FIG. 8 valve body.

Referring to FIGS. 7, 8, and 9, another example of a multi-port diverter valve assembly 60 is illustrated. Valve assembly 60 includes a body portion 61 defining a bore 62. The bore 62 includes an inlet port 63 and outlet ports 64, 65, and 66. The inlet port 63 corresponds to inlet 67. The outlet ports 64, 65, and 66 correspond to outlets 68, 69, and 70, respectively. The outlet ports are arranged about the inlet port 63.

The cartridge assembly 74 of valve assembly 60 includes an upper cartridge portion 75 and a lower cartridge portion 76. The upper and lower cartridge portions 75 and 76 cooperate to form a fluid chamber 77. The fluid chamber 77 is in flow communication with the inlet port 63. The cartridge assembly 74 is held within bore 62 by way of cap 78. The cap 78 includes an external thread 79. External thread 79 is preferably an Acme thread that allows the cap 78 to be threaded out of bore 62. The external thread 79 mates with cooperating internal threads 80 in the body portion 61. A bonnet 84 holds the cartridge assembly 74 and limits movement of the cap 78 within the bore 62. The cap 78 is threadingly engaged through threads 80 of bore 62. The specific pitch of threads 79 are determined according to the desired amount of handle rotation required to obtain the desired hydraulic communication.

The cap 78 is rotatable along threads 79 between a first position where the inlet boss 85 is engaged and sealed within the inlet port 63 and a second portion where the inlet boss 85 is unsealed and disengaged from inlet port 63. An axial space 86 between the upper portion of cap 78 and the bonnet 84 allows movement of the cap to the second position where the inlet boss 85 is no longer in sealed engagement with inlet port 63. Once the inlet boss 85 is no longer engaged with the inlet port 63, fluid is free to flow to any of the outlets 64, 65, and 66 disposed within bore 62.

In the multi-port diverter valve assembly 60 of this other example, fluid can be selectively diverted to any single hydraulic device, any combination of two hydraulic devices, or all of the hydraulic devices. This means a total of seven different flow configurations. The cartridge assembly 74 includes a stem portion 87 that extends upwardly through cap 78. The stem portion 87 is attached to a stem extender as in the first example. The cap 78 also includes an outer sleeve 88. The outer sleeve 88 is attached to an outer handle 89. The inner sleeve (i.e., stem portion 87) is rotatable by the rotation of inner handle 90. In operation, movement of the inner handle 90 moves cartridge assembly 74 to selectively engage any one or a combination of any two outlet ports 64, 65, and 66 to receive fluid flowing from the inlet port 63. Rotation of handle 89 rotates the cap 78 and allows the cartridge assembly 74 to be forced upward out of the inlet port 63 such that fluid may flow to any of the outlet ports 64, 65, and 66 disposed within bore 83 and thus to any of the outlets 68, 69, and 70. The disclosed diverter valve assembly 60 allows multiple hydraulic devices to be supplied with fluid at a common temperature that originates from a mixing valve without the use of multiple valve assemblies.

Figure 10:
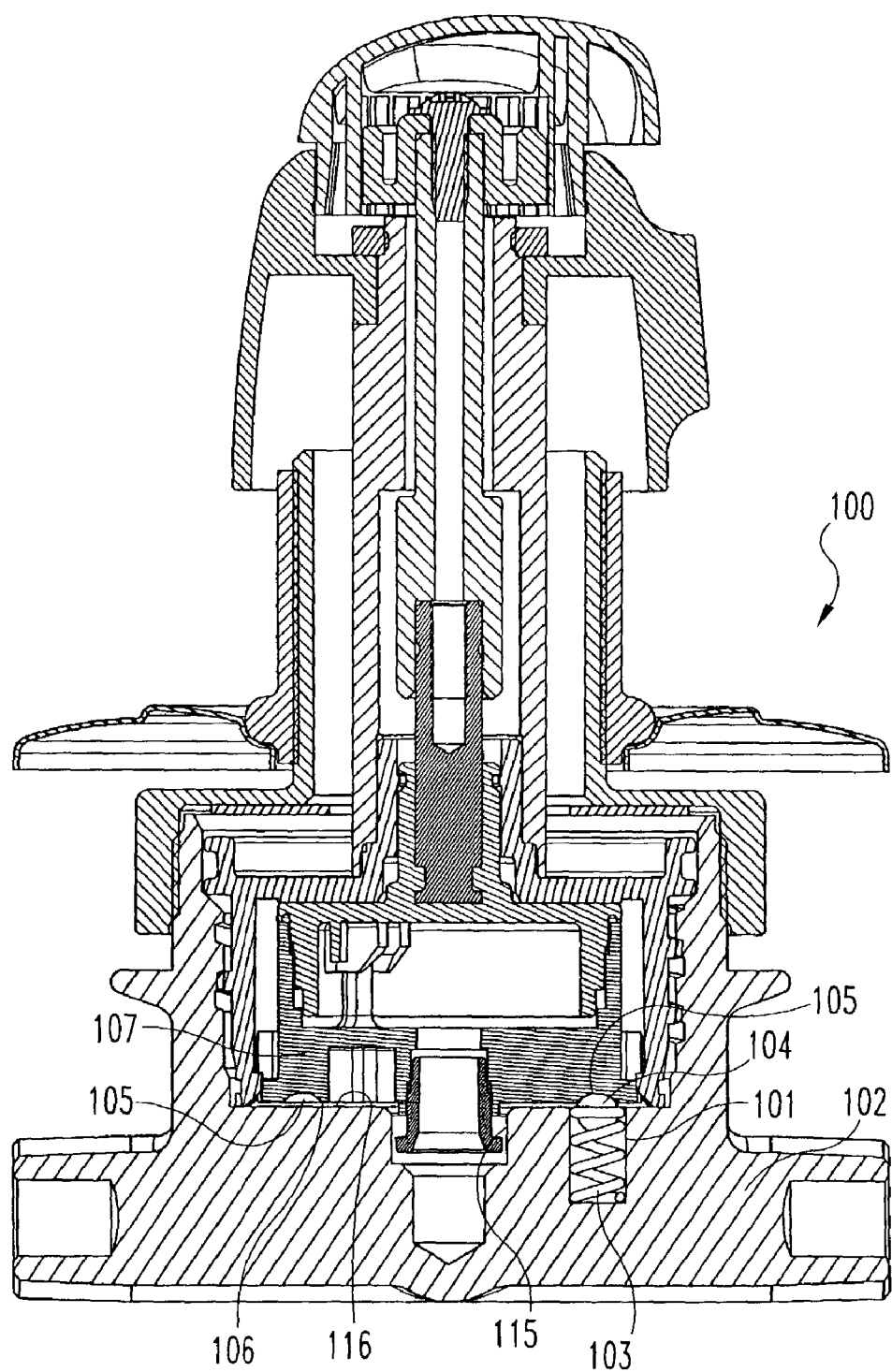
FIG. 10 is a front elevational view of a multi-port diverter valve assembly, similar to FIG. 7 and including a ball detent structure.

Referring now to FIG. 10, another example of a multi-port diverter valve assembly 100 is illustrated. While valve assembly 100 is similar in many respects to valve assembly 60 in both structure and function, a positive detent feature is included as part of valve assembly 100 that was not illustrated in valve assembly 60. As previously mentioned, it is preferred to have a positive location feel so that as the cartridge assembly is rotated to any one of the six (6) detent positions, the user of the valve assembly 100 receives tactile feedback to confirm that a selected one of the available detent positions has been reached. While an audible "click" of the detent engagement would provide an additional confirmation of proper position alignment for the cartridge assembly, this audible "click" is not required.

In the FIG. 10 embodiment, the detent structure for valve 100 includes a closed or blind bore 101 formed or machined into valve body 102 with a biasing spring 103 and a cooperating stainless steel ball 104 positioned in the blind bore. As will be understood, the ball 104 is spherical and is able to move axially relative to bore 101 as spring 103 is compressed and as spring 103 extends. The cooperating portion of the detent structure includes six part-spherical recesses 105 formed in the bottom surface 106 of the lower cartridge portion 107. Each recess 105 is equally spaced circumferentially from its adjacent recess 105. In this way, rotating the cartridge approximately 60 degrees changes the selection of the hydraulic device or devices that are to be serviced by valve assembly 100. The bottom surface 106 of lower cartridge portion 107 is illustrated in FIG. 11.

Figure 11:
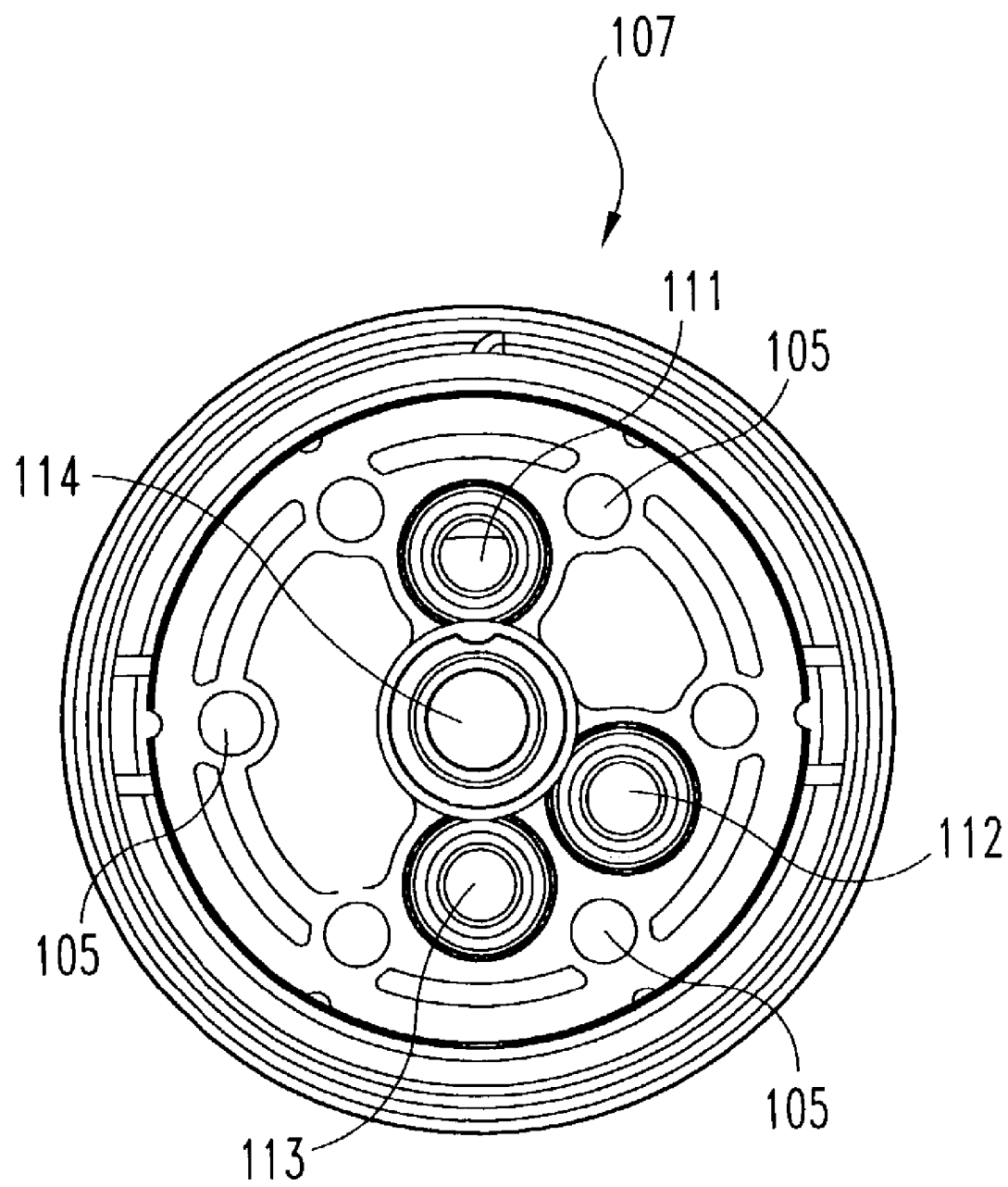
FIG. 11 is a bottom plan view of a lower cartridge portion providing one component of the FIG. 10 diverter valve assembly.

Referring now to FIG. 11, the six part-spherical recesses 105 of cartridge portion 107 are illustrated and are located circumferentially, approximately sixty degrees apart, and are positioned outwardly of outlet ports 111, 112, and 113 and outwardly of inlet port 114. This arrangement of inlet port 114 and outlet ports 111, 112, and 113 is structurally and functionally substantially the same as that described for valve assembly 60. Consistent with what is well known in the art, the receiving bore 115 of the valve body 102 (see FIG. 10) and the facing surface 116 are specifically sized, shaped, and contoured in order to cooperate with outlet ports 111, 112, and 113 and with the rotation of the cartridge in order to supply fluid to one or more of the three hydraulic devices to be serviced by valve assembly 100.

There are six detent positions and three of these positions correspond to the selection of only one of each of the three hydraulic devices. The remaining three positions correspond to a selection of two of the three hydraulic devices.

Each recess 105 has a depth into lower cartridge portion 107 that is less than the spherical radius of the selected stainless steel ball 104. This means that a force vector is applied against the spherical surface of the ball 104 by the edge of the corresponding recess 105 as the lower cartridge portion 107 is rotated. This force vector pushes the ball down into blind bore 101 where it remains until the next recess 105 is reached. Rotating the cartridge into position such that another recess is aligned with ball 104 creates a small clearance space directly above ball 104. Since ball 104 is continuously spring biased, it moves upwardly in the axial direction so as to seat within the corresponding recess. If the particular recess that is encountered by the spring biased ball as the cartridge rotates does not represent selection of the desired one hydraulic device nor selection of the desired combination of hydraulic devices, then rotation of the cartridge continues until the desired selection (i.e., detent position) is reached.

Since the biasing spring 103 and the stainless steel ball 104 represent an added expense to the overall cost of diverter valve assembly 100, it would be an improvement to this design if these detent components could be eliminated without sacrificing the benefits of having a detent-like feature and the tactile, feedback that such a feature provides. As described in the Background section, the present invention provides such an improvement in a novel an unobvious manner. Additionally, the present invention provides a unique anti-rotation feature since the improved detent arrangement is integral relative to the cartridge and cap combination.

Figure 12:
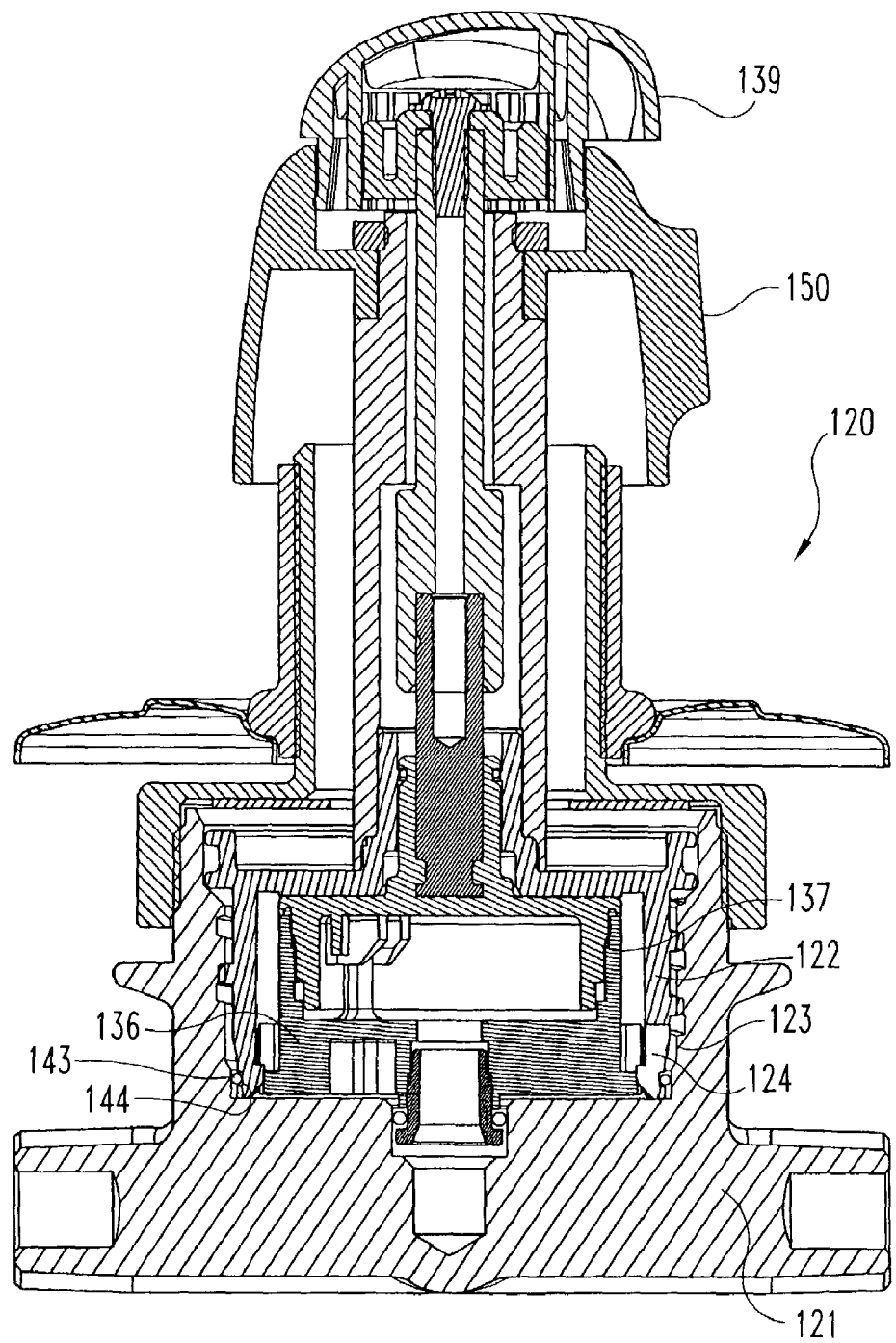
FIG. 12 is a front elevational view, in full section, of a multi-port diverter valve assembly according to a typical embodiment of the present invention.

Referring now to FIG. 12, there is illustrated a multi-port diverter valve assembly 120 according to the present invention. Valve assembly 120 is configured structurally similar to valve assembly 100 and performs in a functionally similar manner with the exception that the spring 103 and ball 104 detent is replaced with a different detent structure.

In addition to the elimination of the biasing spring 103 in detent ball 104, the blind bore 101 in the valve body 102 is also eliminated from the new valve body 121. In order to provide a "replacement" detent feature, the externally-threaded cap 122 that threads into the bore 123 of valve body 121 includes depending fingers 124 unitarily molded as part of cap 122. In the preferred embodiment (see FIG. 13), there are two such depending fingers 124 that are located approximately 180 degrees apart. However, the actual number of fingers 124 can be increased or reduced to only one.

Each finger 124 is defined relative to the remainder of cap 122 by a pair of lengthwise clearance slots 125 and 126 provided for each finger 124. Each finger 124 is unitarily joined at its upper edge 127 to the remainder of cap 122 so as to enable the free end 128 to be deflectable inwardly and outwardly while effectively "hinged" at edge 127. The inner surface 132 of each finger 124 includes a raised bump 133 or protrusion that extends radially inwardly so as to engage one of six molded recesses 134 that are equally spaced around the outer periphery 135 of the lower cartridge portion 136 of the cartridge assembly 137. The outer periphery 135 is substantially cylindrical. Cartridge assembly 137 is virtually identical to the cartridge assembly of FIG. 10 except for the respective changes. Accordingly, the lower cartridge portion 136, like portion 107, includes an inlet port and three outlet ports. As the cartridge assembly 137 is rotated by means of handle 139 (see FIG. 12) and the cooperating and connecting structure, the recesses 134 rotate, forcing the two bumps 133 to each cam out of engagement with their corresponding recesses until the next recesses are encountered, at which point each bump 133 detents into its aligned recess 134. This camming action deflects the corresponding finger 124 outwardly. If the new position is not the selection of interest for the desired hydraulic device of combination of devices, rotation of the cartridge assembly 137 continues until the position corresponds to the selection of interest.

With continued reference to FIG. 12, positioned around the lower portion of cap, 122 is an O-ring 143 that fits within groove 144. Groove 144 is formed into two arcuate sections 145 and 146 (see FIG. 13) extending from one clearance slot 125 or 126 adjacent one finger 124 to another clearance slot 126 or 125, respectively, adjacent the other finger 124. The resistance of the plastic for the fingers 124 and the resiliency of the O-ring 143 (depending on its size, material, and durometer) cooperate to provide a resistance load against outward radial movement of the fingers 124. Accordingly, as the handle 139 is rotated such the bumps 133 cam out of one pair of recesses 134 and later detent into another pair of recesses, there is a definite tactile feel provided to the user that confirms to that user that the selected position has been reached.

Figure 13:
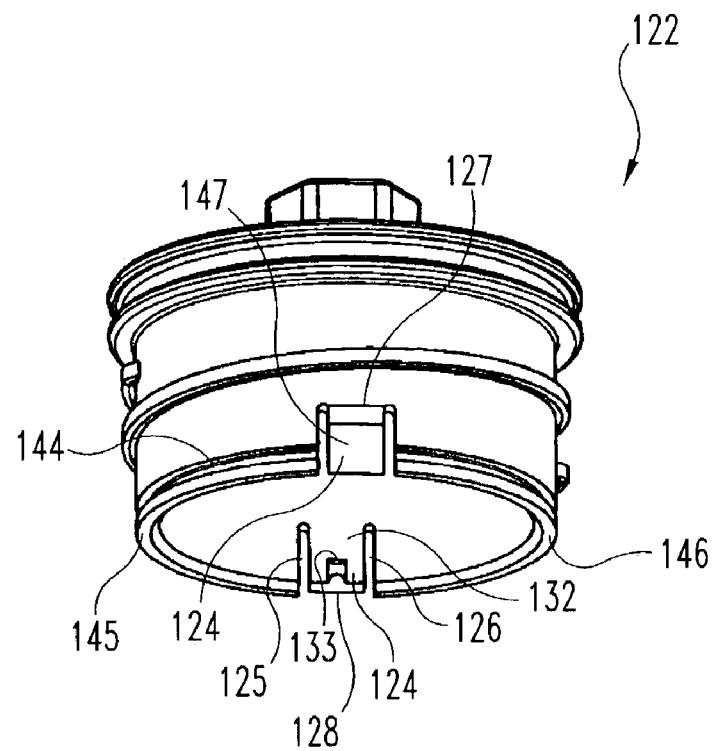
FIG. 13 is an exploded, perspective view of a cap and cartridge subassembly comprising a portion of the FIG. 12 diverter valve assembly, according to the present invention.
Figure 13:
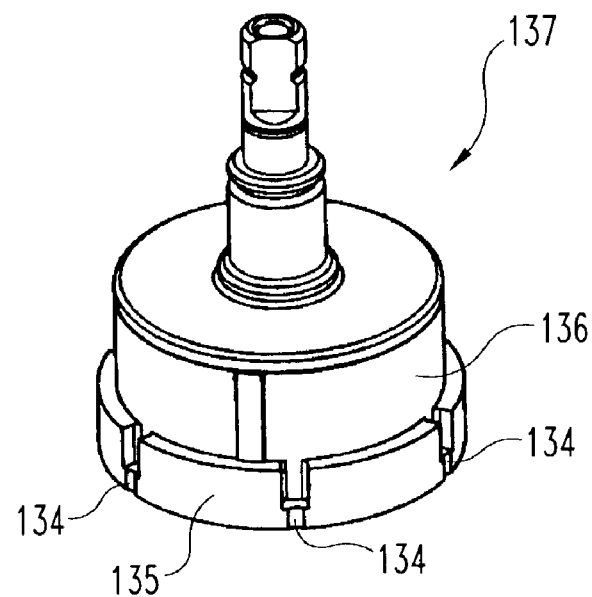

By recessing the O-ring 143 into groove 144 at each location around the circumference of the O-ring 143, except at the location of the two fingers 124, it helps to reduce the insertion force. By shaping the outer surface 147 of each finger 124 with a taper, each finger 124 is allowed to flex radially outwardly without interfering with the valve body 121. One capability of the structure illustrated in FIG. 12 for valve assembly 120 is the rotation of handle 150 to allow flow out from all outlet ports. When this occurs, the engagement of the raised bumps 133 into the recesses 134 prevents rotation of the cartridge assembly 137 within cap 122. With the prior diverter valve assembly design that uses a biasing spring and stainless steel ball for the detent feature, once handle 150 is moved up, the ball 104 becomes disengaged with the recesses 105 and cannot provide any anti-rotation feature or capability. However, with the disclosed invention as illustrated in FIGS. 12 and 13, use of handle 150 in this manner, so as to allow flow out to all outlet ports, retains the assembled combination of the cartridge assembly 137 and cap 122 such that the integral detent arrangement involving fingers 124 and recesses 134 remain functional and thereby provide an anti-rotation feature for the cartridge assembly when in this specific configuration.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A flow diverter valve assembly comprising:
    a valve body defining a plurality of flaw passageways;
    a rotatable diverter cartridge positioned within said valve body, said rotatable diverter cartridge defining a plurality of detent recesses;
    a cap assembled into said valve body and being positioned between said valve body and said rotatable diverter cartridge, said cap including at least one deflectable detent finger constructed and arranged to sequentially engage each of said plurality of detent recesses;
    wherein each deflectable detent finger includes a raised bump, said raised bump being the portion of each deflectable detent finger that engages its corresponding detent recess; and
    means for manually rotating said rotatable diverter cartridge relative to said cap to change one detent engagement to another detent engagement, wherein each detent engagement corresponds to a different fluid flow selection.

2. The flow diverter valve assembly of claim 1 which further includes an annular O-ring positioned between said cap and said valve body.

3. The flow diverter valve assembly of claim 2 wherein said cap defines a pair of slots associated with each deflectable detent finger, each pair of said slots being positioned adjacent their corresponding deflectable detent finger.

4. The flow diverter valve assembly of claim 3 wherein said cap defines a pair of arcuate O-ring grooves, each O-ring groove being positioned between said deflectable detent fingers.

5. A flow diverter valve assembly comprising:
a valve body defining a plurality of flow passageways;
a rotatable diverter cartridge positioned within said valve body, said rotatable diverter cartridge defining six detent recesses, a flow inlet port, and three flow outlet ports;
a cap assembled into said valve body and being positioned between said valve body and said rotatable diverter cartridge, said cap including at pair of deflectable detent fingers constructed and arranged to sequentially engage each of said six detent recesses;
wherein each deflectable detent finger includes a raised bump, said raised bump being the portion of each deflectable detent finger that engages its corresponding detent recess; and
means for manually rotating said rotatable diverter cartridge relative to said cap to change one detent engagement to another detent engagement, wherein each detent engagement corresponds to a different fluid flow selection, wherein said six detent recesses are circumferentially, equally spaced apart and said pair of deflectable detent fingers are equally spaced apart such that detent recess engagement by one detent finger occurs when the other detent finger engages another detent recess.

6. A flow diverter valve assembly comprising:
a valve body defining a plurality of flow passageways;
a rotatable diverter cartridge positioned within said valve body, said rotatable diverter cartridge defining a plurality of detent recesses;
a cap assembled into said valve body and being positioned between said valve body and said rotatable diverter cartridge, said cap including a pair of deflectable detent fingers constructed and arranged to sequentially engage each of said plurality of detent recesses, wherein each deflectable detent finger includes a raised bump, said raised bump being the portion of each deflectable detent finger that engages its corresponding detent recess; and
means for manually rotating, said rotatable diverter cartridge relative to said cap to change one detent engagement to another detent engagement, wherein each detent engagement corresponds to a different fluid flow selection.

7. A flow diverter valve assembly comprising:
a valve body defining a plurality of flow passageways;
a rotatable diverter cartridge positioned within said valve body, said rotatable diverter cartridge defining a plurality of detent recesses;
a cap assembled into said valve body and being positioned between said valve body and said rotatable diverter cartridge, said cap including a pair of deflectable detent fingers constructed and arranged to sequentially engage each of said plurality of detent recesses;
an annular O-ring positioned between said cap and said valve body, wherein said cap defines a pair of arcuate O-ring grooves, each O-ring groove being positioned between said deflectable detent fingers; and
means for manually rotating said rotatable diverter cartridge relative to said cap to change one detent engagement to another detent engagement, wherein each detent engagement corresponds to a different fluid flow selection.

8. A flow diverter valve assembly comprising:
a valve body defining a plurality of flow passageways;
a rotatable diverter cartridge, positioned within said valve body, said rotatable diverter cartridge defining a plurality of detent recesses;
a cap assembled into said valve body and being positioned between said valve body and said rotatable diverter cartridge, said cap including at least one deflectable detent finger constructed and arranged to sequentially engage each of said plurality of detent recesses, wherein said cap defines a pair of slots associated with each deflectable detent finger, each pair of said slots being positioned adjacent their corresponding deflectable detent finger; and
means for manually rotating said rotatable diverter cartridge relative to said cap to change one detent engagement to another detent engagement, wherein each detent engagement corresponds to a different fluid flow selection.

* * * * *

UNITED STATES PATENT AND TRADEMARK OFFICE
CERTIFICATE OF CORRECTION

| | | |
|---|---|---|
| PATENT NO. | : 7,066,204 B2 | Page 1 of 1 |
| APPLICATION NO. | : 10/629799 | |
| DATED | : June 27, 2006 | |
| INVENTOR(S) | : Garry R. Marty | |

It is certified that error appears in the above-identified patent and that said Letters Patent is hereby corrected as shown below:

Column 8,
  Line 38, replace "flaw" with -- flow -- .

Signed and Sealed this

Ninth Day of January, 2007

JON W. DUDAS
*Director of the United States Patent and Trademark Office*